US009608447B2

(12) United States Patent
Luo

(10) Patent No.: US 9,608,447 B2
(45) Date of Patent: *Mar. 28, 2017

(54) SOLAR PHOTOVOLTAIC THREE-PHASE MICRO-INVERTER AND A SOLAR PHOTOVOLTAIC GENERATION SYSTEM

(71) Applicant: Altenergy Power System, Inc., Zhejiang (CN)

(72) Inventor: Yuhao Luo, Zhejiang (CN)

(73) Assignee: ALTENERGY POWER SYSTEM, INC., Zhejiang (CN)

( * ) Notice: Subject to any disclaimer, the term of this patent is extended or adjusted under 35 U.S.C. 154(b) by 666 days.

This patent is subject to a terminal disclaimer.

(21) Appl. No.: 14/076,006

(22) Filed: Nov. 8, 2013

(65) Prior Publication Data

US 2014/0062198 A1 Mar. 6, 2014

Related U.S. Application Data

(63) Continuation of application No. PCT/CN2012/070065, filed on Jan. 5, 2012.

(30) Foreign Application Priority Data

May 11, 2011 (CN) .......................... 2011 1 0122492

(51) Int. Cl.
*H02J 3/38* (2006.01)
*H02M 1/14* (2006.01)
*H02M 7/48* (2007.01)

(52) U.S. Cl.
CPC ................ *H02J 3/38* (2013.01); *H02J 3/385* (2013.01); *H02M 1/14* (2013.01); *H02M 7/4807* (2013.01); *Y02E 10/58* (2013.01); *Y10T 307/492* (2015.04)

(58) Field of Classification Search
CPC ....................................................... H02J 3/38
(Continued)

(56) References Cited

U.S. PATENT DOCUMENTS 7,663,268 B2 * 2/2010 Wen ....................... H02M 5/458
307/18
7,855,473 B2 * 12/2010 Fornage ................... H02J 3/26
307/82

(Continued)

FOREIGN PATENT DOCUMENTS

| CN | 200994112 Y | 12/2007 |
|---|---|---|
| CN | 101651436 A | 2/2010 |
| CN | 202026248 U | 11/2011 |

OTHER PUBLICATIONS

Xiao, Weidong, "Topology Study of Photovoltaic Interface for Maximum Power Point Tracking," IEEE Transactions on Industrial Electronics, vol. 54, No. 3, Jun. 2007, pp. 1696-1704.*

(Continued)

*Primary Examiner* — Joseph Chang
(74) *Attorney, Agent, or Firm* — Kilpatrick Townsend & Stockton

(57) ABSTRACT

The invention provides a solar photovoltaic three-phase micro-inverter, comprising DC terminals, connected with three DC photovoltaic assemblies for receiving DC; three single-phase inverter circuits, having DC input terminals connected with the DC photovoltaic assemblies via the terminals, for converting the DC to AC; AC terminals, connected with the AC output terminals of the inverter circuits and a three-phase AC power grid, for outputting the AC generated by the inverter circuits; wherein DC input terminals of each inverter circuit are connected in parallel with each other, and AC output terminals are connected with one phase of the three-phase AC power grid and a neutral wire via the AC terminals. The invention further provides a (Continued)

solar photovoltaic generation system. The invention connects DC sides of three single-phase inverter circuits in parallel, which can simply eliminate ripple power at DC side input terminals in a three-phase micro-inverter.

15 Claims, 13 Drawing Sheets

(58) Field of Classification Search
USPC .................................................. 307/82, 42
See application file for complete search history.

(56) References Cited

U.S. PATENT DOCUMENTS

| | | |
|---|---|---|
| 2010/0236612 A1 | 9/2010 | Khajehoddin et al. |
| 2013/0334888 A1* | 12/2013 | Luo .................. H02J 3/383 |
| | | 307/82 |
| 2014/0132076 A1* | 5/2014 | Luo .................. H02M 7/42 |
| | | 307/82 |

OTHER PUBLICATIONS

The International Search Report from PCT/CN2012/070065, dated Apr. 12, 2012. English Translation version only.

* cited by examiner

SOLAR PHOTOVOLTAIC THREE-PHASE MICRO-INVERTER AND A SOLAR PHOTOVOLTAIC GENERATION SYSTEM

TECHNICAL FIELD

The invention relates to the technical field of power converter eliminating ripple power, and more particularly, the invention relates to a solar photovoltaic three-phase micro-inverter and a solar photovoltaic generation system.

BACKGROUND ART

Many renewable energy sources produce direct current, for example, solar photovoltaic and chemical batteries. Direct current (DC) is converted into sinusoidal alternating current (AC) having a fixed frequency via an inverter, and the AC is transmitted to an electric grid or is used in a grid-disconnected way.

The inverter in a solar photovoltaic generation system recently trends to employ distributed micro-inverters. The micro-inverter may provide maximum power point control for each DC photovoltaic assembly, such that each DC photovoltaic assembly can produce a maximum energy, thereby improving the performance of the whole solar photovoltaic generation system. Furthermore, the micro-inverter may also generate a low AC voltage output, rather than a high DC voltage output of a centralized inverter system, so that the security and efficiency of the system can be improved.

FIG. 2 is a structural schematic diagram of a single-phase inverter of the prior art. As shown, the single-phase inverter 200 may comprise a DC-DC conversion circuit 201 and a DC-AC conversion circuit 202, with a storage capacitor 203 disposed at the DC input terminal so as to reduce ripple voltage.

FIG. 3 is a schematic diagram of a circuit structure of a single-phase inverter having flyback full bridge topology in the prior art. As shown, the single phase inverter 300 may comprise a DC-DC conversion circuit 301 and a DC-AC conversion circuit 302. The DC-DC conversion circuit 301 is used for controlling MPPT (Maximum Power Point Tracking) and generating sinusoidal wave to output a semi-sinusoidal wave. The DC-DC conversion circuit 301 may comprise a storage capacitor 303, a current detection element 304, a voltage detection element 305 and a flyback circuit 306. The flyback circuit 306 may further comprise a transformer T, a switch valve Q and a diode D. The main coil of the transformer T is connected with the switch valve Q in series and the secondary coil thereof and the diode D are connected to the output in series. Take a single flyback as an example here. Two or more interleaved flyback can also be used. The DC-AC conversion circuit 302 is H full bridge operating at a power frequency so as to invert semi-cycle sinusoidal wave and form a complete sinusoidal wave. And it can employ low-frequency, low-power consumption element, e.g. thyristor, etc.

One basic feature of a single phase inverter is as follows: an energy transmission between a power supply and a load comprises average energy and ripple of double frequency. The inverter wants to obtain DC having no ripple from a DC power supply and then transmits the averaged energy and ripple energy to the load, so that it is required that there is an energy storage unit in the inverter to handle the ripple energy. FIG. 1 is a waveform schematic of ripple power at DC terminals of a single-phase inverter in the prior art. As shown, the inverter generates an output power in-phase with AC grid energy, so that the output energy is oscillated between zero and a peak output power. When the output power of the inverter is zero, the current of photovoltaic assembly does not flow through the inverter, thus charging the storage capacitor; when the output power of the inverter is a peak value, the storage capacitor discharges to supplement power for the photovoltaic assembly, and thus the peak value goes to twice of the average. Thus, charging and discharging of the storage capacitor provide an additional AC component over the DC provided by the photovoltaic assembly, which is referred to as ripple power.

In order to manage ripple power having a double frequency, energy should be stored and released at a double frequency. To avoid a large voltage ripple caused by energy changing, a large capacitor is needed. Generally, an inverter employs in DC line a large capacity electrolytic capacitor as a passive filter. However, an electrolytic capacitor has various failure modes, and especially, a ripple current leads to self-heating inside the capacitor, thereby reducing the lifetime. An active filter circuit is widely studied to replace passive methods, which provides another ripple that counteracts double frequency ripple power by a separate energy conversion circuit. However, the method needs complex circuit and control method.

Thus, there is a need for simply eliminating ripple power at DC side in a photovoltaic grid-connected inverter.

SUMMARY

The technical problem solved by the invention is to provide a solar photovoltaic three-phase micro-inverter and a solar photovoltaic generation system, which can simply eliminate ripple power at DC-side input terminals of the three-phase micro-inverter.

To solve the above technical problem, the invention provides a solar photovoltaic three-phase micro-inverter, comprising:

DC terminals, connected with three DC photovoltaic assemblies, for receiving DC generated by the DC photovoltaic assemblies;

three single-phase inverter circuits having DC input terminals connected respectively with the three DC photovoltaic assemblies via the DC terminals, for converting the DC generated by the DC photovoltaic assemblies to AC, respectively;

AC terminals connected with the AC output terminals of the three single-phase inverter circuits and a three-phase AC power grid, for grid-connectedly outputting the AC generated by the three single-phase inverter circuits;

wherein the DC input terminals of each single-phase inverter circuit are in parallel with each other and the AC output terminals thereof are connected respectively with one of the three phases of the three-phase AC power grid and a neutral wire via the AC terminals.

Optionally, the three-phase micro-inverter further comprising:

current detection elements, connected in series with the three DC photovoltaic assemblies, for measuring input current provided by the DC photovoltaic assemblies;

voltage detection elements, cross-connected between the DC input terminals of any of the three single-phase inverter circuits and ground, for measuring the input voltage of the DC photovoltaic assemblies.

Optionally, the three DC photovoltaic assemblies are independent with each other.

Optionally, the three DC photovoltaic assemblies are in series with each other first and then connected with the DC terminals.

Optionally, the single-phase inverter circuit comprising:

a DC-DC conversion circuit, connected with the DC terminals, for maximum power point tracking control;

a DC-AC conversion circuit, connected respectively with the DC-DC conversion circuit and the AC terminals, for a sinusoidal wave generation and grid-connection.

Optionally, the single-phase inverter circuit comprises: a DC detection circuit, an AC detection circuit, a control circuit, a communication circuit, a power supply circuit and a grid-connected circuit.

Optionally, the three single-phase inverter circuits share a set of AC detection circuit, a control circuit, a communication circuit and a power supply circuit.

The invention further provides a solar photovoltaic three-phase micro-inverter, comprising:

DC terminals, connected with three DC photovoltaic assemblies, for receiving DC generated by the DC photovoltaic assemblies;

three single-phase inverter circuits having DC input terminals connected respectively with the three DC photovoltaic assemblies via the DC terminals, for converting the DC generated by the three DC photovoltaic assemblies to AC, respectively;

AC terminals connected with the AC output terminals of the three single-phase inverter circuits and a three-phase AC power grid, for grid-connectedly outputting the AC generated by the three single-phase inverter circuits;

wherein each single-phase inverter circuit comprises a DC-DC conversion circuit, for maximum power point tracking control, the output terminals of the DC-DC conversion circuit are in parallel with each other, and the AC output terminals of the three single-phase inverter circuits are connected respectively with one of the three phases of the three-phase AC power grid and a neutral wire via the AC terminals.

Optionally, each single-phase inverter circuit further comprises a DC-AC conversion circuit, connected respectively with the DC-DC conversion circuit and the AC terminals, for a sinusoidal wave generation and grid-connection.

Optionally, the three-phase micro-inverter further comprising:

current detection elements, connected in series with three DC photovoltaic assemblies, respectively, for measuring input current provided by the DC photovoltaic assemblies;

voltage detection elements, cross-connected between the DC input terminals of the three single-phase inverter circuits and ground, respectively, for measuring input voltage of the DC photovoltaic assemblies.

Optionally, the three DC photovoltaic assemblies are independent with each other.

Optionally, the single-phase inverter circuit further comprises a DC detection circuit, an AC detection circuit, a control circuit, a communication circuit, a power supply circuit and a grid-connected circuit.

Optionally, the three single-phase inverter circuits share a set of AC detection circuit, a control circuit, a communication circuit and a power supply circuit.

Correspondingly, the present invention provides a solar photovoltaic generation system, comprising a plurality of solar photovoltaic three-phase micro-inverters, the AC terminals of the plurality of solar photovoltaic three-phase micro-inverters are connected with the respective phases and neutral wire of a three-phase AC power grid respectively, wherein each three-phase micro-inverter comprising:

DC terminals, connected with three DC photovoltaic assemblies, for receiving DC generated by the DC photovoltaic assemblies; three single-phase inverter circuits having DC input terminals connected respectively with the three DC photovoltaic assemblies via the DC terminals, for converting the DC generated by the three DC photovoltaic assemblies to AC, respectively; AC terminals connected with the AC output terminals of the three single-phase inverter circuits and a three-phase AC power grid, for grid-connectedly outputting the AC generated by the three single-phase inverter circuits; wherein AC output terminals of each single-phase inverter circuit are in parallel with each other and the AC output terminals are connected respectively with one of the three phases of the three-phase AC power grid and a neutral wire via the AC terminals.

Optionally, the AC terminals of the plurality of three-phase micro-inverters are connected with each other first to form a three-phase micro-inverter chain, and then connected with the three-phase AC power grid.

Optionally, the plurality of three-phase micro-inverters are independent from each other, and have their AC terminals connected with the respective phases and neutral wire of the three-phase AC power grid, respectively.

Optionally, the three-phase micro-inverter further comprising:

current detection elements, connected in series with the three DC photovoltaic assemblies, for measuring input current provided by the DC photovoltaic assemblies;

voltage detection elements, cross-connected between the DC input terminals of any of the three single-phase inverter circuits and ground, for measuring input voltage of the DC photovoltaic assemblies.

Optionally, the three DC photovoltaic assemblies are independent with each other.

Optionally, the three DC photovoltaic assemblies are in series with each other first and then connected with the DC terminals.

Optionally, the single-phase inverter circuit comprising:

a DC-DC conversion circuit, connected with the DC terminals, for maximum power point tracking control;

a DC-AC conversion circuit, connected respectively with the DC-DC conversion circuit and the AC terminals, for a sinusoidal wave generation and grid-connection.

Optionally, the single-phase inverter circuit comprises a DC detection circuit, an AC detection circuit, a control circuit, a communication circuit, a power supply circuit and a grid-connected circuit.

Optionally, the three single-phase inverter circuits share a set of AC detection circuit, a control circuit, a communication circuit and a power supply circuit.

The present invention further provides a solar photovoltaic generation system, comprising plurality of solar photovoltaic three-phase micro-inverters; the AC terminals of the plurality of solar photovoltaic three-phase micro-inverters are connected with the respective phases and neutral wire of a three-phase AC power grid respectively, wherein each three-phase micro-inverter comprises:

DC terminals, connected with three DC photovoltaic assemblies, for receiving DC generated by the DC photovoltaic assemblies three single-phase inverter circuits having DC input terminals connected respectively with the three DC photovoltaic assemblies via the DC terminals, for converting the DC generated by the three DC photovoltaic assemblies to AC, respectively;

AC terminals connected with the AC output terminals of the three single-phase inverter circuits and a three-phase AC power grid, for grid-connectedly outputting the AC generated by the three single-phase inverter circuits;

wherein each single-phase inverter circuit comprises a DC-DC conversion circuit, for maximum power point tracking control, the output terminals of the DC-DC conversion circuit are in parallel with each other and the AC output terminals of the three single-phase inverter circuits are connected respectively with one of the three phases of the three-phase AC power grid and a neutral wire via the AC terminals.

Optionally, each single-phase inverter circuit further comprises a DC-AC conversion circuit, connected respectively with the DC-DC conversion circuit and the AC terminals, for a sinusoidal wave generation and grid-connection.

Optionally, the AC terminals of the plurality of three-phase micro-inverters are connected with each other first to form a three-phase micro-inverter chain, and then connected with the three-phase AC power grid.

Optionally, the plurality of three-phase micro-inverters are independent from each other, and have their AC terminals connected with the respective phases and neutral wire of the three-phase AC power grid, respectively.

Optionally, the three-phase micro-inverter further comprising:

current detection elements, connected in series with three DC photovoltaic assemblies, respectively, for measuring input current provided by the DC photovoltaic assemblies;

voltage detection elements, cross-connected between the DC input terminals of the three single-phase inverter circuits and ground, respectively, for measuring input voltage of the DC photovoltaic assemblies.

Optionally, the three DC photovoltaic assemblies are independent with each other.

Optionally, the single-phase inverter circuit comprises a DC detection circuit, an AC detection circuit, a control circuit, a communication circuit, a power supply circuit and a grid-connected circuit.

Optionally, the three single-phase inverter circuits share a set of AC detection circuit, a control circuit, a communication circuit and a power supply circuit.

As compared with the prior art, the present invention have the following advantages:

The invention connects DC sides of three single-phase inverter circuits in parallel, and the AC terminals are connected to a three-phase AC cable then are incorporated into a three-phase AC power grid. Since respective phases of a three-phase AC are sinusoid waves with a phase difference of 120 degrees, the ripple powers at DC input terminals of respective single-phase inverter circuits also have a phase difference of 120 degree. So, the sum of the three ripple powers is zero, i.e. the ripple power at DC input terminals of the three single-phase inverter circuit is zero. Thus, storage capacitor for storage energy at DC side of a single-phase inverter circuit can be eliminated. In principle, when phase L1 charges storage capacitor, phases L2 and L3 discharge the storage capacitor, so the three-phase micro-inverter of the invention can simply eliminate ripple power at DC side input terminal.

BRIEF DESCRIPTION OF THE DRAWINGS

The above and other features, properties and advantages of the invention will be more apparent from the following description in conjunction with the drawings and embodiments, wherein.

DETAILED DESCRIPTION

The invention will be further described in conjunction with the following specific embodiments and the drawings, although the invention is not limited to these.

Figure 1:
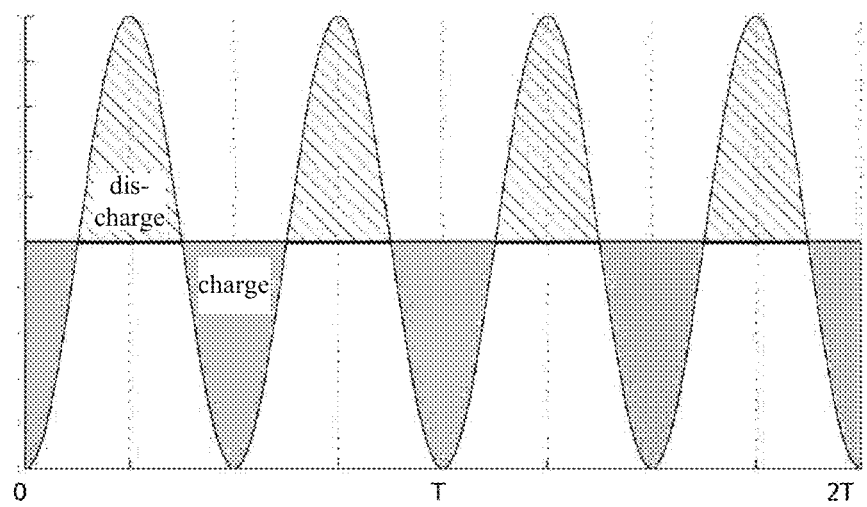
FIG. 1 is a wave schematic of ripple power at DC terminals of a single-phase inverter in the prior art.
Figure 2:
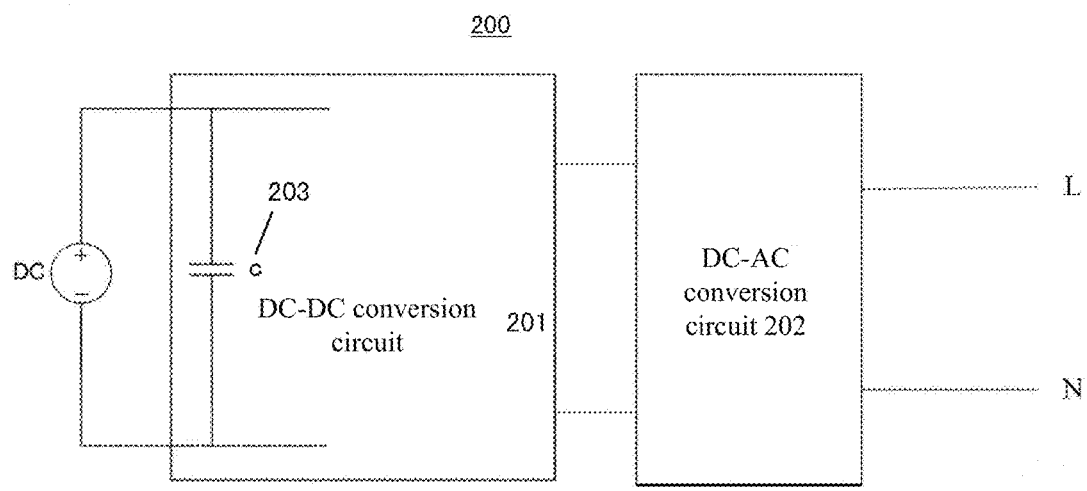
FIG. 2 is a structural schematic of a single-phase inverter in the prior art.
Figure 3:
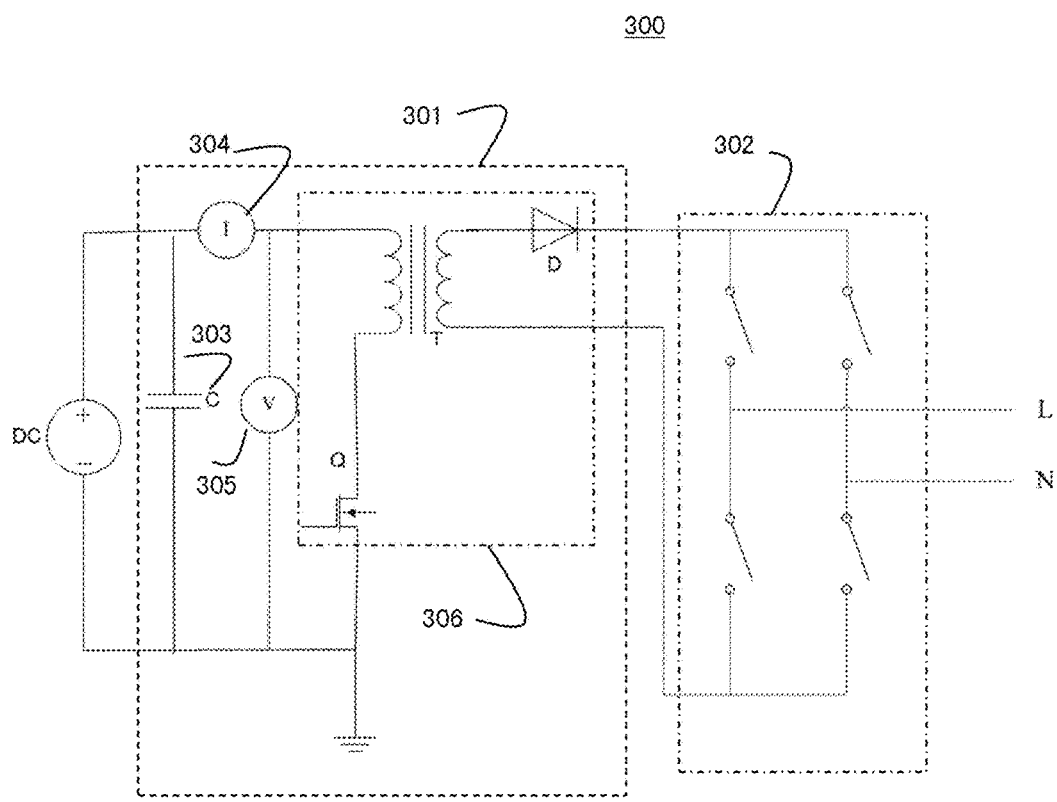
FIG. 3 is a schematic diagram of a circuit structure of a single-phase inverter having flyback full bridge topology in the prior art.
Figure 4:
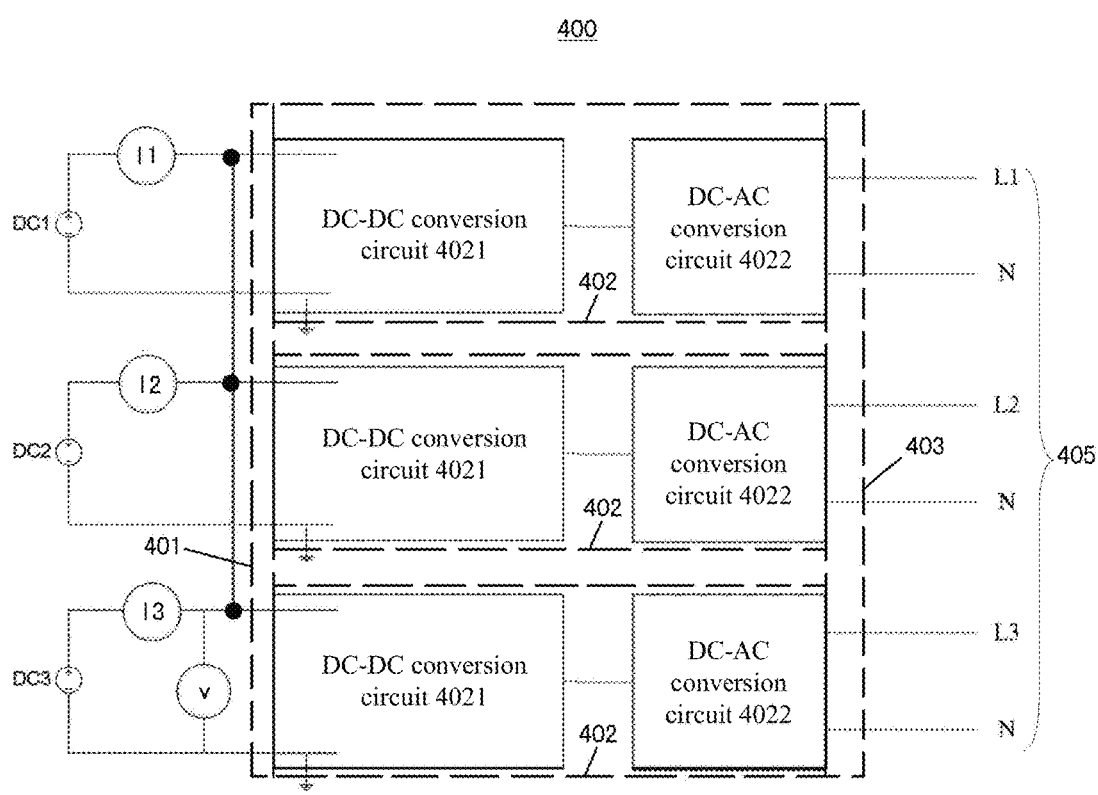
FIG. 4 is a structural schematic diagram of a solar photovoltaic three-phase micro-inverter without storage capacitor according to one embodiment of the invention.

FIG. 4 is a structural schematic diagram of a solar photovoltaic three-phase micro-inverter without storage capacitor according to one embodiment of the invention. As shown, the solar photovoltaic three-phase micro-inverter 400 may comprise:

DC terminals 401, connected with three DC photovoltaic assemblies DC1, DC2, DC3, for receiving DC generated by the DC photovoltaic assemblies DC1, DC2, DC3;

three single-phase inverter circuits 402, for example, three single-phase flyback inverter circuits, having DC input terminals connected respectively with the three DC photovoltaic assemblies DC1, DC2, DC3 via the DC terminals 401, for converting the DC generated by the three DC photovoltaic assemblies DC1, DC2, DC3 to AC, respectively;

AC terminals 403, connected with the AC output terminals of the three single-phase inverter circuits 402 and a three-phase AC power grid 405, for grid-connectedly outputting the AC generated by the three single-phase inverter circuits 402;

wherein DC input terminals of each single-phase inverter circuit 402 are connected in parallel with each other and AC output terminals thereof are connected respectively with one of the three phases L1, L2, or L3 of the three-phase AC power grid 402 and a neutral wire N via AC terminals 403. Since the total power of three phases is a constant, ripple power generated at DC input terminals is zero, and storage capacitor is eliminated.

Figure 5:
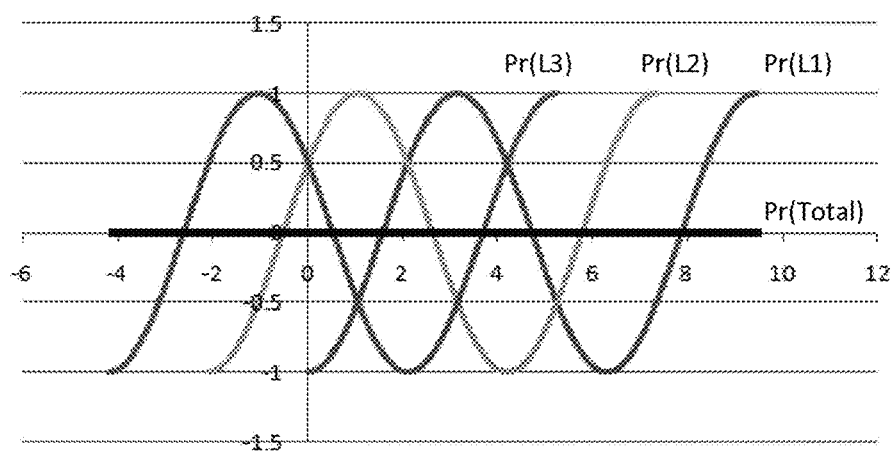
FIG. 5 is a curve schematic diagram of ripple power of DC input terminals of three single-phase inverter circuits of a solar photovoltaic three-phase micro-inverter without storage capacitor and the sum thereof according to one embodiment of the invention.

FIG. 5 is a curve schematic diagram of ripple power of DC input terminals of three single-phase inverter circuits of a solar photovoltaic three-phase micro-inverter without storage capacitor and the sum thereof according to one embodiment of the invention. In detail, the ripple power $p_r(L1)$, $p_r(L2)$, $p_r(L3)$ for three phases L1, L2 and L3 are calculated as follows:

$$p_r(L1) p_o \cos(2\omega t)$$
$$p_r(L2) = p_o \cos 2\left(\omega t - \frac{2\pi}{3}\right) = p_o \cos\left(2\omega t - \frac{4\pi}{3}\right)$$
$$p_r(L3) = p_o \cos 2\left(\omega t - \frac{4\pi}{3}\right) = p_o \cos\left(2\omega t - \frac{8\pi}{3}\right) = p_o \cos\left(2\omega t - \frac{2\pi}{3}\right)$$

Then, the sum of the ripple power $p_r$(total) for three phases L1, L2 and L3 can be obtained as follows:

$$p_r(\text{Total}) = p_r(L1) + p_r(L2) + p_r(L3) =$$
$$p_o \cos(2\omega t) + p_o \cos\left(2\omega t - \frac{4\pi}{3}\right) + p_o \cos\left(2\omega t - \frac{2\pi}{3}\right) = 0$$

So, when three DC inputs of the three-phase inverter 400 are connected in parallel, the total ripple power $p_r$(total) is zero.

Continued as shown in FIG. 4, in the embodiment, the three-phase micro-inverter 400 may further comprise:

a current detection elements I1, I2 and I3, connected in series with the three DC photovoltaic assemblies DC1, DC2, DC3, respectively, for measuring input currents provided by the three DC photovoltaic assemblies DC1, DC2, DC3;

a voltage detection elements V, cross-connected between the DC input terminal of any of the three single-phase inverter circuits 402 and ground, respectively, for measuring input voltages of the three DC photovoltaic assemblies DC1, DC2, DC3.

Figure 6:
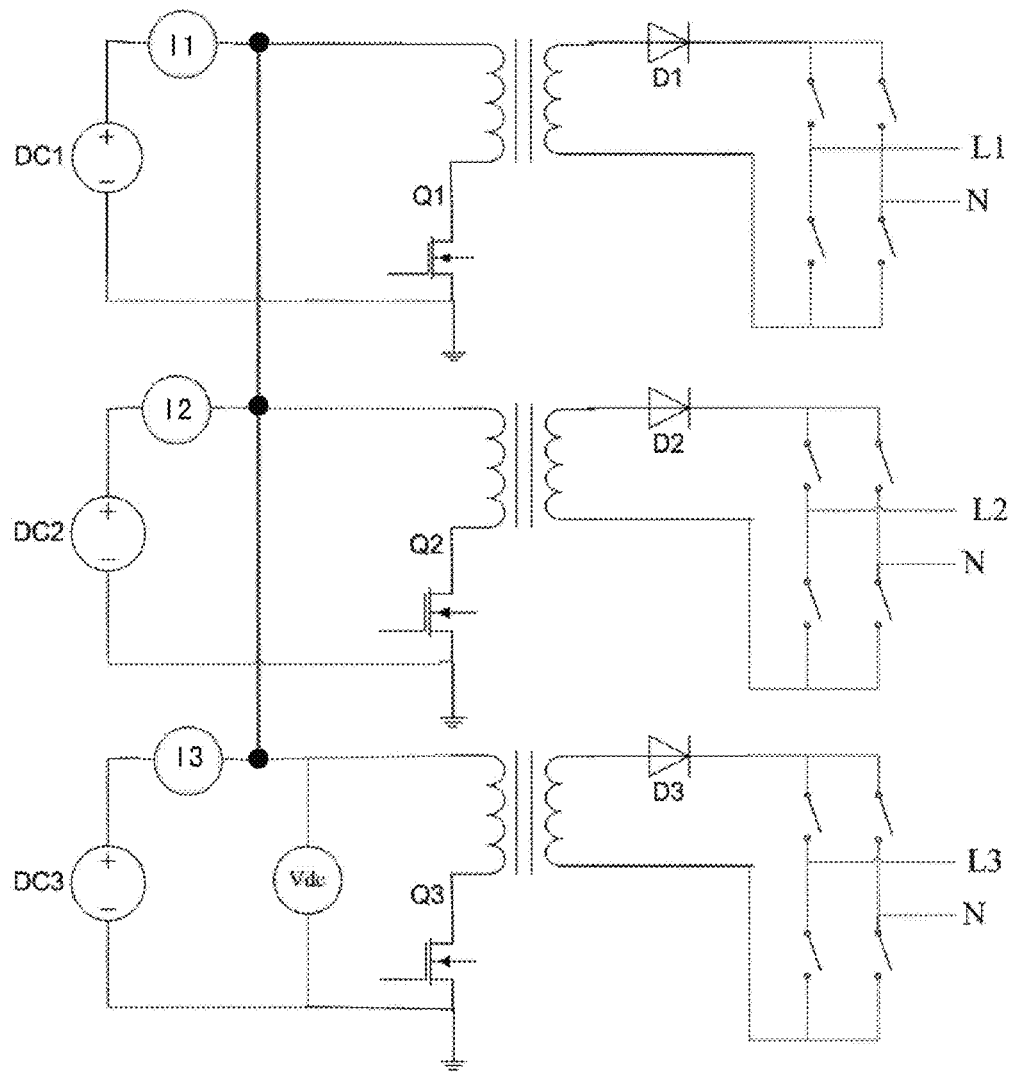
FIG. 6 is a circuit schematic diagram of a solar photovoltaic three-phase micro-inverter without storage capacitor according to one embodiment of the invention.

FIG. 6 is a schematic diagram of a circuit of a solar photovoltaic three-phase micro-inverter without storage capacitor according to one embodiment of the invention. As shown, the input currents provided by each of the DC photovoltaic assemblies DC1, DC2, DC3 are detected by current detection elements I1, I2 and I3; the voltage of the three lines are identical, uniformly detected by a voltage detection element V; the output power of each of the DC photovoltaic assemblies DC1, DC2, DC3 is obtained by the current multiplied by the voltage, for monitoring performance and failure of each assembly.

In the embodiment, the three DC photovoltaic assemblies DC1, DC2, DC3 are independent from each other, each connected with the DC terminals 401 of the three-phase micro-inverter 400.

Figure 7:
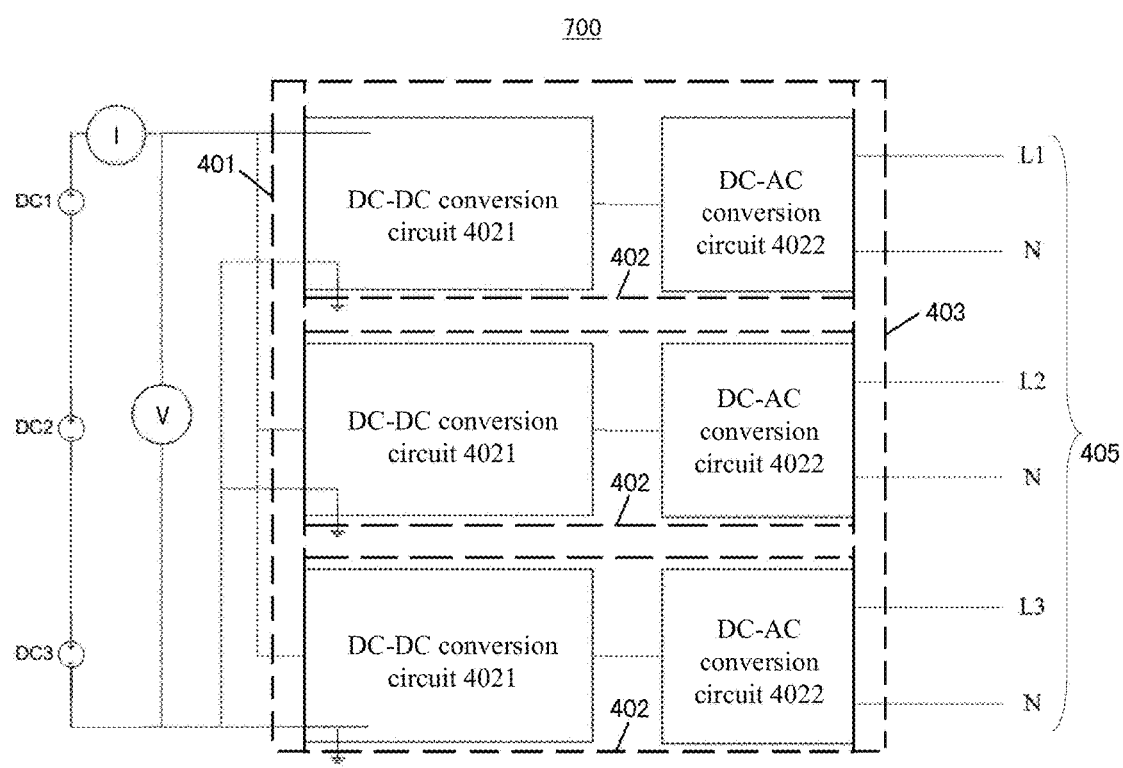
FIG. 7 is a structural schematic diagram of a solar photovoltaic three-phase micro-inverter without storage capacitor according to another embodiment of the invention.

And FIG. 7 is a schematic diagram of a circuit of a solar photovoltaic three-phase micro-inverter without storage capacitor according to another embodiment of the invention. As shown, in the solar photovoltaic three-phase micro-inverter 700, the three DC photovoltaic assemblies DC1, DC2, DC3 could be connected in series with each other first and then connected with the DC terminals 401 of the three-phase micro-inverter 400. The DC terminals 401 are connected with DC input terminals of three single-phase inverter circuits 402. The input current provided by an assembly chain comprising the three DC photovoltaic assemblies DC1, DC2, DC3 is detected by a current detection element I; the total voltage of the assembly chain is detected by a voltage detection element V; the output power of the assembly chain is obtained by the current multiplied by the voltage, for monitoring performance and failure for the assembly chain.

Figure 8:
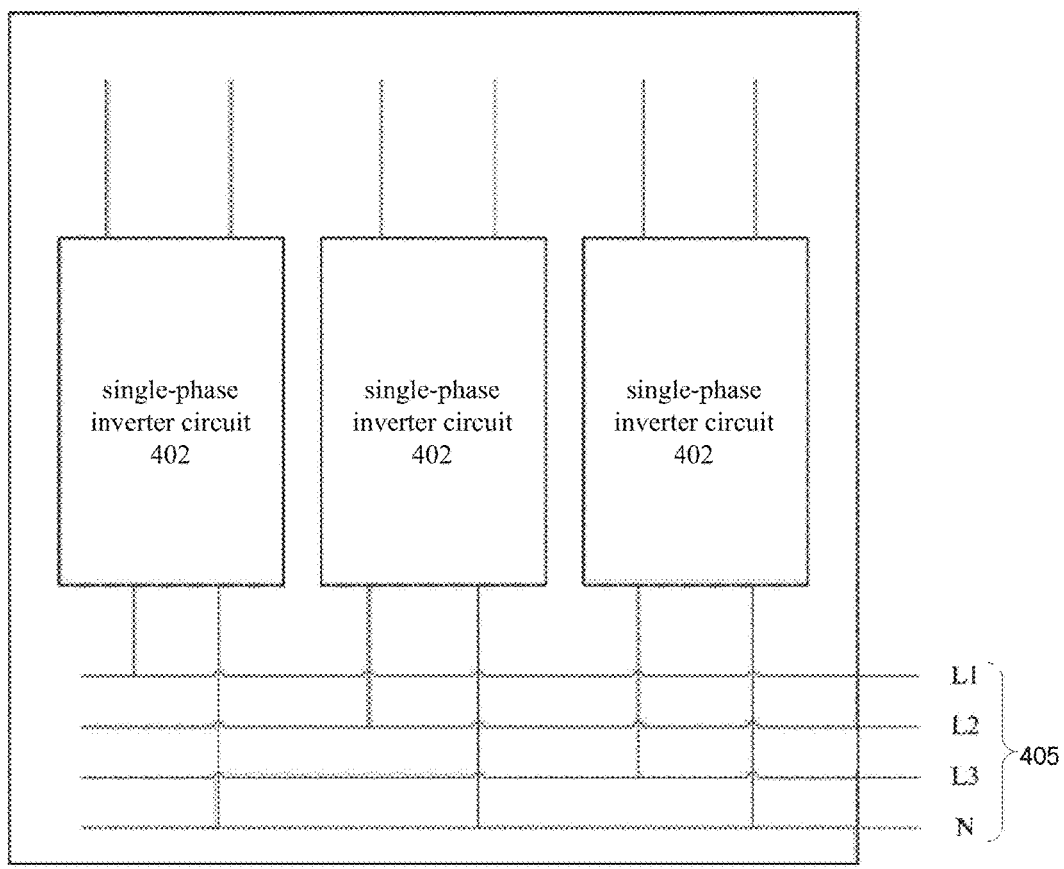
FIG. 8 is a structural schematic diagram of a solar photovoltaic three-phase micro-inverter connected to a three-phase AC power grid according to one embodiment of the invention.

FIG. 8 is a structural schematic diagram of a solar photovoltaic three-phase micro-inverter connected to a three-phase AC power grid according to one embodiment of the invention. As shown, the three single-phase inverter circuits 402 will generate an AC which matches the phase of the voltage of the three-phase AC power grid 405.

Back to FIGS. 4 and 7, in the invention, the single-phase inverter circuit 402 may comprise:

a DC-DC conversion circuit 4021, connected with DC terminals 401, for maximum power point tracking control;

a DC-AC conversion circuit 4022, connected respectively with the DC-DC conversion circuit 4021 and AC terminals 403, for a sinusoidal wave generation and grid-connection.

Figure 9:
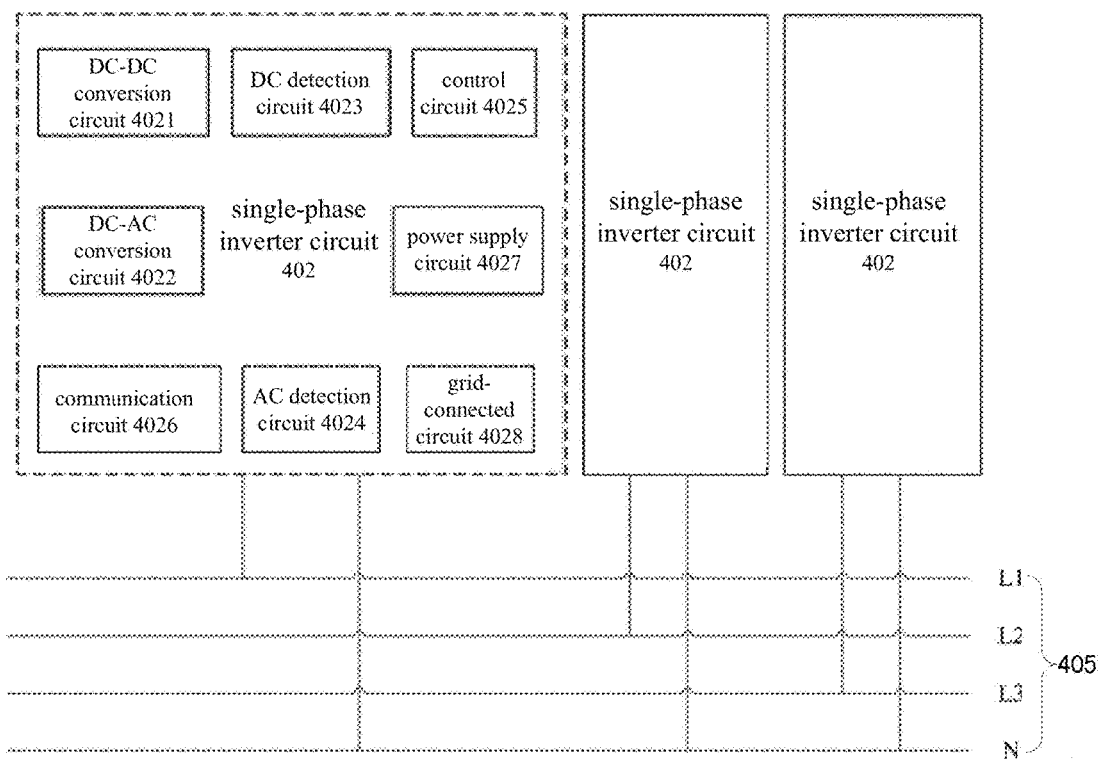
FIG. 9 is a detailed structural schematic diagram of a single-phase inverter circuit of a solar photovoltaic three-phase micro-inverter according to one embodiment of the invention.

In addition, the single-phase inverter circuits 402 may further comprise other circuits. FIG. 9 is a detailed structural schematic diagram of a single-phase inverter circuit of a solar photovoltaic three-phase micro-inverter according to one embodiment of the invention. As shown, the single-phase inverter circuit 402 may further comprise: a DC detection circuit 4023, an AC detection circuit 4024, a control circuit 4025, a communication circuit 4026, a power supply circuit 4024 and a grid-connecting circuit 4028.

Of course, in the invention, the single-phase inverter circuit 402 may further comprise other necessary components which are well-known by those skilled in the art, rather than being limited to the above circuit structure.

Figure 10:
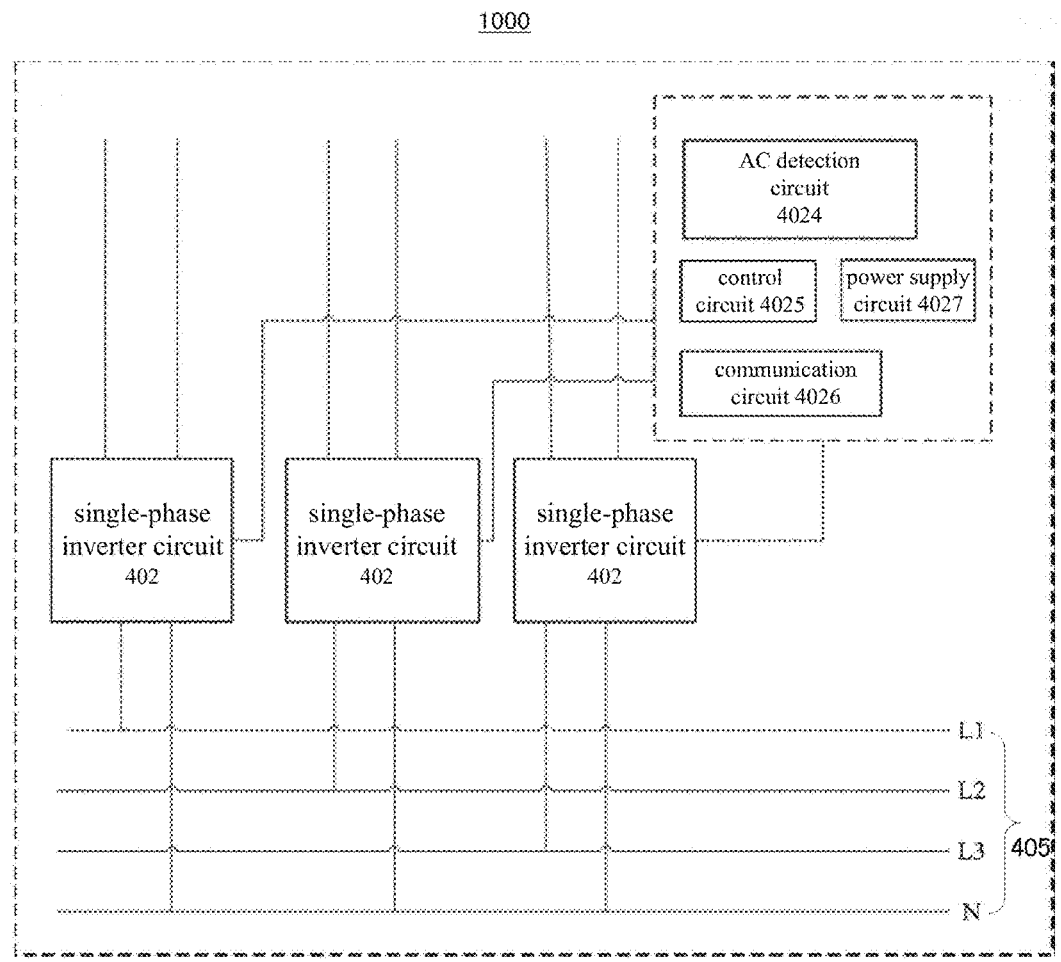
FIG. 10 is a schematic diagram of some shared circuits of three single-phase inverter circuits of a solar photovoltaic three-phase micro-inverter according to another embodiment of the invention.
Figure 11:
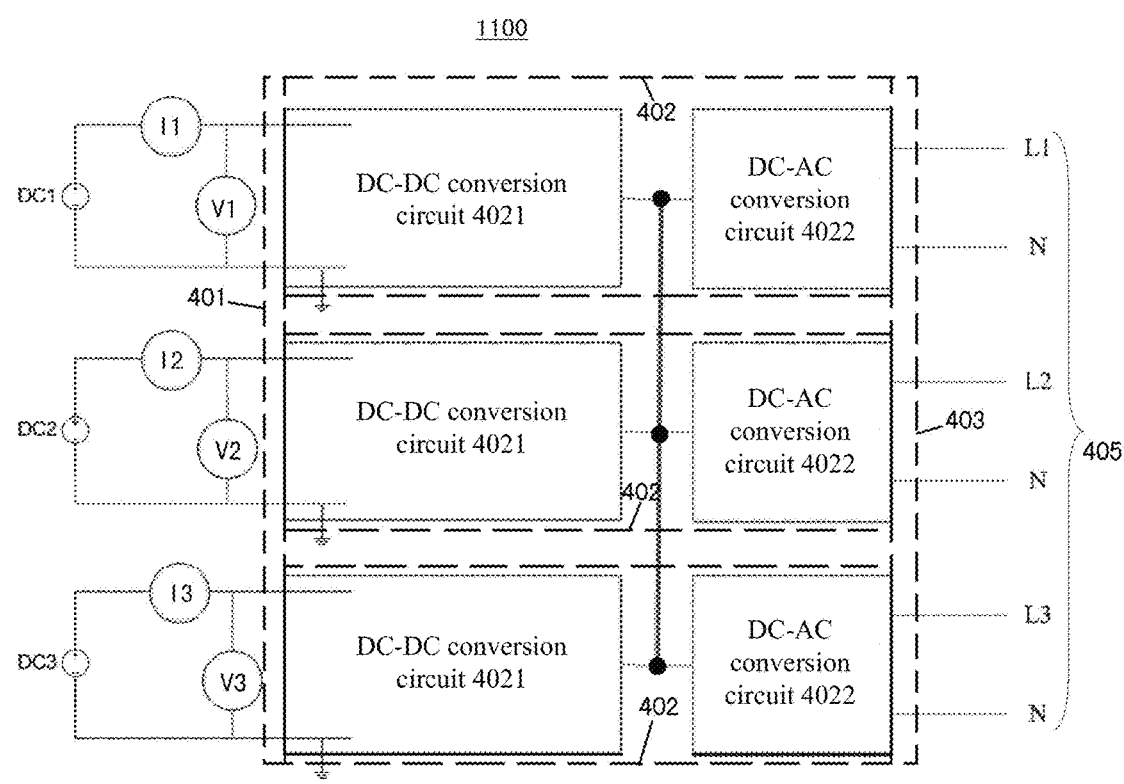
FIG. 11 is a structural schematic diagram of a solar photovoltaic three-phase micro-inverter without storage capacitor according to another embodiment of the invention.

FIG. 10 is a schematic diagram of some circuits shared by three single-phase inverter circuits of a solar photovoltaic three-phase micro-inverter according to another embodiment of the invention. As shown, in the three-phase micro-inverter 1000, three single-phase inverter circuits 402 may share a set of AC detection circuit 4024, a control circuit 4025, a communication circuit 4026 and a power supply circuit 4027. Such a three-phase micro-inverter 1000 can eliminate two sets of shared circuits, so that not only the cost of manufacturing can be reduced, but also the reliability of the three-phase micro-inverter can be improved. FIG. 11 is a structural schematic diagram of a solar photovoltaic three-phase micro-inverter without storage capacitor according to another embodiment of the invention. As shown, the solar photovoltaic three-phase micro-inverter 1000 may comprise:

DC terminals 401, connected with three DC photovoltaic assemblies DC1, DC2, DC3, for receiving DC generated by the DC photovoltaic assemblies;

three single-phase inverter circuits 402, for example, three single-phase flyback inverter circuit, having DC input terminals connected respectively with the three DC photovoltaic assemblies DC1, DC2, DC3, via the DC terminals 401, for converting the DC generated by the three DC photovoltaic assemblies DC1, DC2, DC3 to AC, respectively;

AC terminals 403, connected with the AC output terminals of the three single-phase inverter circuits 402 and a three-phase AC power grid 405, respectively, for grid-connectedly outputting the AC generated by the three single-phase inverter circuits 402;

wherein each single-phase inverter circuit 402 comprising a DC-DC conversion circuit 4021, for maximum power point tracking (MPPT) control, the output terminals of the DC-DC conversion circuit 4021 are connected in parallel from each other, the AC output terminals of the three single-phase inverter circuits 402 are connected with one phase of three phases L1, L2, or L3 and neutral wire N of a three-phase AC power grid 405. Since the total power of three phases is a constant, ripple power generated at DC input terminals is zero and storage capacitor is eliminated.

In the embodiment, each single-phase inverter circuit 402 may further comprises a DC-AC conversion circuit 4022, connected with the DC-DC conversion circuit 4021 and the AC terminals 403, respectively for a sinusoidal wave generation and grid-connection. Since the outputs of the three DC-DC conversion circuits 4021 are connected in parallel with each other, thus the ripple power are eliminated at output terminals of the DC-DC conversion circuits while the DC inputs of the three lines are independent from each other. The three assemblies are connected respectively with DC terminals 401 of the three-phase micro-inverter 1100, with the current and voltage being detected independently and controlled respectively to obtain a maximum power point, so that each assembly outputs a maximum power. The data of each assembly is independent, which is used for monitoring performance and failure of each assembly.

Continued as shown in FIG. 11, in the embodiment, the three-phase micro-inverter 1100 may further comprise:

a current detection elements I1, I2 and I3, connected in series with three DC photovoltaic assemblies DC1, DC2, DC3, respectively, for measuring input currents provided by the DC photovoltaic assemblies DC1, DC2, DC3;

voltage detection elements V1, V2 and V3, cross-connected between the DC input terminals of the three single-phase inverter circuits 402 and ground, respectively, for measuring input voltages of the DC photovoltaic assemblies DC1, DC2, DC3.

In the embodiment, the three DC photovoltaic assemblies DC1, DC2, DC3 may be independent from each other, each connected with the DC terminals 401 of the three-phase inverter 1100.

Similarly, the single-phase inverter circuits 402 of the present embodiment may further comprise other circuits. As shown in FIG. 9, the single-phase inverter circuit 402 may further comprise: a DC detection circuit 4023, an AC detection circuit 4024, a control circuit 4025, a communication circuit 4026, a power supply circuit 4027 and grid-connected circuit 4028.

Of course, in the invention, the single-phase inverter circuit 402 may further comprise other necessary components which are well-known by those skilled in the art, rather than being limited to the above circuit structure.

Similarly, the three single-phase inverter circuits 402 may share some circuits. As shown in FIG. 10, three single-phase inverter circuits 402 may share a set of AC detection circuit 4024, a control circuit 4025, a communication circuit 4026 and a power supply circuit 4027.

Figure 12:
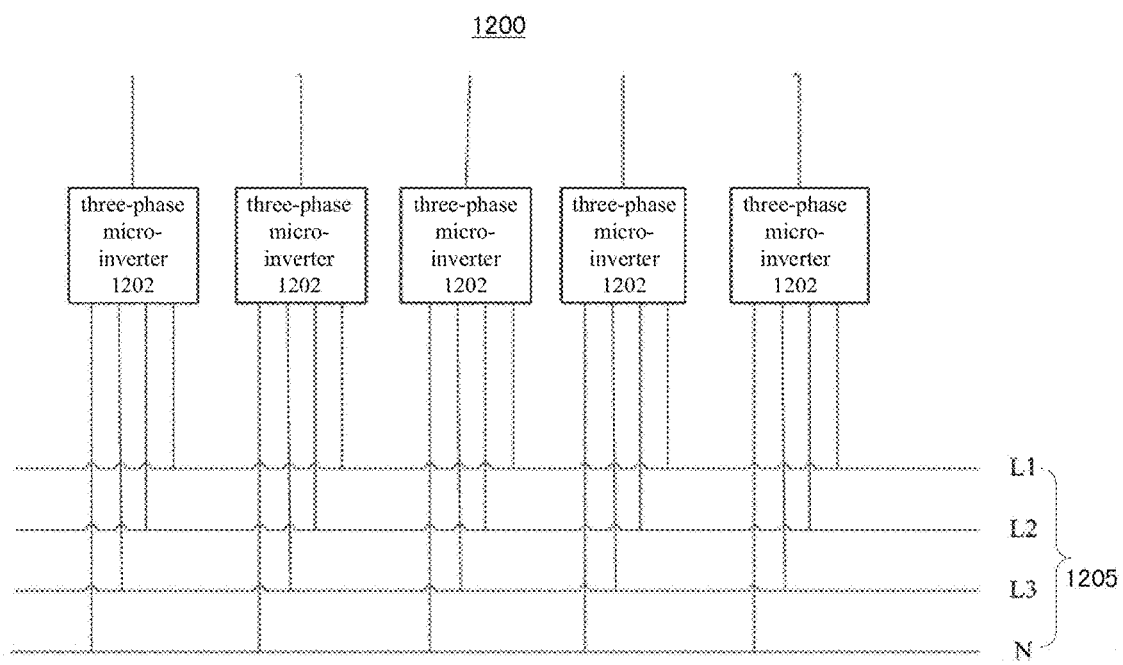
FIG. 12 is a structural schematic diagram of a solar photovoltaic generation system comprising plurality of above three-phase micro-inverters according to one embodiment of the invention.

FIG. 12 is a structural schematic diagram of a solar photovoltaic generation system comprising a plurality of the above three-phase micro-inverters according to one embodiment of the invention. As shown, the solar photovoltaic generation system 1200 may comprise a plurality of any of the above solar photovoltaic three-phase micro-inverters 1202, and the plurality of three-phase micro-inverters 1202 are independent from each other, and have their AC terminals connected with the respective phases L1, L2 or L3 of the three-phase AC power grid 1205 and neutral wire N, respectively.

Figure 13:
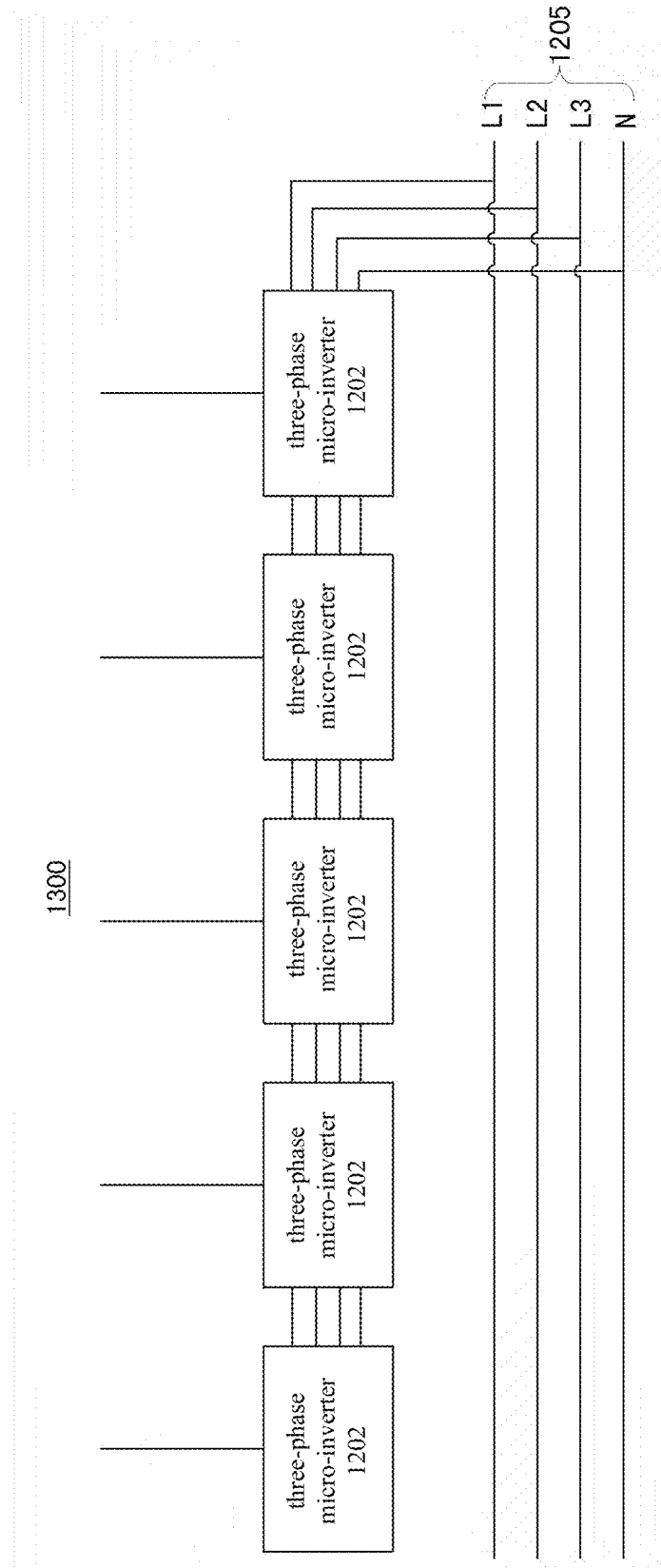
FIG. 13 is a structural schematic diagram of a solar photovoltaic generation system comprising plurality of above three-phase micro-inverters according to another embodiment of the invention.

FIG. 13 is a structural schematic diagram of a solar photovoltaic generation system comprising a plurality of the above three-phase micro-inverters according to another embodiment of the invention. As shown, the solar photovoltaic generation system 1200 may comprise a plurality of any of the above solar photovoltaic three-phase micro-inverters 1202, the AC terminals of the plurality of three-phase micro-inverters 1202 are connected with each other first to form a three-phase micro-inverter chain, and then connected with the respective phase L1, L2, or L3 of the three-phase AC power grid 1205 and a neutral wire N.

The present invention connects the DC sides of three single-phase inverter circuits in parallel, and the AC terminals are connected to a three-phase AC cable and then are incorporated into a three-phase AC power grid. Since the respective phases of a three-phase AC are sinusoid waves with a phase difference of 120 degrees, the ripple power at DC input terminals of the respective single-phase inverter circuits also has a phase difference of 120 degrees. So, the sum of the three ripple powers is zero, i.e. the ripple power at DC input terminals of the three single-phase inverter circuit is zero. Thus, storage capacitor for storage energy at DC side of a single-phase inverter circuit can be eliminated. In principle, when phase L1 charges the storage capacitor, phases L2 and L3 discharge the storage capacitor, so the three-phase micro-inverter of the invention can simply eliminate ripple power at DC side input terminals.

Although the invention has been disclosed above with preferred embodiments, which are not intended to limit the invention, possible variations and modifications can be made by those skilled in the art without departing from the spirit and scope of the invention. Accordingly, the scope of the invention is defined by the Claims of the invention.

The invention claimed is:

1. A solar photovoltaic three-phase micro-inverter, comprising:
DC terminals, connected with three DC photovoltaic assemblies, for receiving DC generated by the DC photovoltaic assemblies;
three single-phase inverter circuits, having DC input terminals connected respectively with the three DC photovoltaic assemblies via the DC terminals, for converting the DC generated by the three DC photovoltaic assemblies to AC, respectively, wherein the three single-phase inverter circuits share a set of an AC detection circuit, a control circuit, a communication circuit and a power supply circuit;
AC terminals, connected with the AC output terminals of the three single-phase inverter circuits and a three-phase AC power grid, for grid-connectedly outputting the AC generated by the three single-phase inverter circuits;
wherein each single-phase inverter circuit comprises a DC-DC conversion circuit for maximum power point tracking control, the output terminals of the DC-DC conversion circuits are connected in parallel with each other and the AC output terminals of the three single-phase inverter circuits are connected respectively with one phase of three phases of the three-phase AC power grid and a neutral wire via the AC terminals.

2. The three-phase micro-inverter of claim 1, wherein each single-phase inverter circuit comprises a DC-AC conversion circuit, connected with the DC-DC conversion circuit and the AC terminals, respectively, for a sinusoidal wave generation and grid-connection.

3. The three-phase micro-inverter of claim 2, further comprising:
current detection elements, connected in series with three DC photovoltaic assemblies, respectively, for measuring input currents provided by the DC photovoltaic assemblies;
voltage detection elements, cross-connected between the DC input terminals of the three single-phase inverter circuits and ground, respectively, for measuring input voltages of the DC photovoltaic assemblies.

4. The three-phase micro-inverter of claim 3, wherein the three DC photovoltaic assemblies are independent from each other.

5. The three-phase micro-inverter of claim 4, wherein the single-phase inverter circuit further comprising: a DC detection circuit and a grid-connected circuit.

6. A solar photovoltaic generation system, comprising a plurality of solar photovoltaic three-phase micro-inverters, AC terminals of the plurality of solar photovoltaic three-phase micro-inverters are connected with respective phases of a three-phase AC power grid and a neutral wire, wherein each three-phase micro-inverter comprising:
DC terminals, connected with three DC photovoltaic assemblies, for receiving DC generated by the DC photovoltaic assemblies;
three single-phase inverter circuits, having DC input terminals connected respectively with the three DC photovoltaic assemblies via the DC terminals, for converting the DC generated by the DC photovoltaic assemblies to AC, respectively, wherein the three single-phase inverter circuits share a set of an AC detection circuit, a control circuit, a communication circuit and a power supply circuit;
AC terminals, connected with the AC output terminals of the three single-phase inverter circuits and a three-phase AC power grid, for grid-connectedly outputting the AC generated by the three single-phase inverter circuits;
wherein each single-phase inverter circuit comprises a DC-DC conversion circuit, for maximum power point tracking control, the output terminals of the DC-DC conversion circuit are connected in parallel with each other, and the AC output terminals of the three single-phase inverter circuits are connected respectively with one phase of three phases of the three-phase AC power grid and a neutral wire via the AC terminals.

7. The solar photovoltaic generation system of claim 6, wherein each single-phase inverter circuit further comprising a DC-AC conversion circuit, connected respectively with the DC-DC conversion circuit and the AC terminals, for a sinusoidal wave generation and grid-connection.

8. The solar photovoltaic generation system of claim 7, wherein the AC terminals of the plurality of three-phase micro-inverters are connected with each other first to form a three-phase micro-inverter chain, and then connected with the three-phase AC power grid.

9. The solar photovoltaic generation system of claim 7, wherein the plurality of three-phase micro-inverters are independent from each other, and have their AC terminals connected with the respective phases and neutral wire of the three-phase AC power grid, respectively.

10. The solar photovoltaic generation system of claim 8, wherein the three-phase micro-inverter further comprising:
current detection elements, connected in series with three DC photovoltaic assemblies, respectively, for measuring input currents provided by the DC photovoltaic assemblies;
voltage detection elements, cross-connected between the DC input terminals of the three single-phase inverter circuits and ground, respectively, for measuring input voltages of the DC photovoltaic assemblies.

11. The solar photovoltaic generation system of claim 10, wherein the three DC photovoltaic assemblies are independent from each other.

12. The solar photovoltaic generation system of claim 11, wherein the single-phase inverter circuit further comprising: a DC detection circuit and a grid-connected circuit.

13. The solar photovoltaic generation system of claim 9, wherein the three-phase micro-inverter further comprising:
current detection elements, connected in series with three DC photovoltaic assemblies, respectively, for measuring input currents provided by the DC photovoltaic assemblies;
voltage detection elements, cross-connected between the DC input terminals of the three single-phase inverter circuits and ground, respectively, for measuring input voltages of the DC photovoltaic assemblies.

14. The solar photovoltaic generation system of claim 13, wherein the three DC photovoltaic assemblies are independent from each other.

15. The solar photovoltaic generation system of claim 14, wherein the single-phase inverter circuit further comprising: a DC detection circuit and a grid-connected circuit.

* * * * *